United States Patent [19]

Sudoh et al.

[11] Patent Number: 5,093,903
[45] Date of Patent: Mar. 3, 1992

[54] SYSTEM FOR CONTROLLING PRINTERS HAVING DIFFERING DOT DENSITIES

[75] Inventors: Eisho Sudoh; Seiji Asano, both of Tokyo, Japan

[73] Assignee: Oki Electric Industry Co., Ltd., Tokyo, Japan

[21] Appl. No.: 158,237

[22] Filed: Feb. 19, 1988

[30] Foreign Application Priority Data

Feb. 23, 1987 [JP] Japan ................................. 62-37776

[51] Int. Cl.$^5$ ............................................ G06F 15/62
[52] U.S. Cl. ..................................... 395/102; 395/110; 395/139; 395/151; 340/735
[58] Field of Search ....................... 364/518, 521, 523; 340/735, 790; 400/70, 109

[56] References Cited

U.S. PATENT DOCUMENTS

| | | | |
|---|---|---|---|
| 3,805,252 | 4/1974 | Morris et al. | 364/200 |
| 4,439,761 | 3/1984 | Fleming et al. | 340/735 |
| 4,559,614 | 12/1985 | Peek et al. | 340/735 X |
| 4,580,242 | 4/1986 | Suzuki et al. | 340/735 X |
| 4,598,293 | 7/1986 | Tung et al. | 340/735 X |
| 4,709,232 | 11/1987 | Leger | 340/735 X |
| 4,735,515 | 4/1988 | Ueda et al. | 400/109 |
| 4,737,779 | 4/1988 | Somigli et al. | 340/790 X |
| 4,827,254 | 5/1989 | Nishiyama | 340/735 X |
| 4,843,405 | 6/1989 | Morikawa et al. | 364/521 X |

OTHER PUBLICATIONS

Nigel Davies, "Basic Printers", vol. 28, No. 1, Jan./Feb. 86, pp. 24-25.
Hewlett Packard, "Technical Reference Manual", Laserjet 2000 Printer, First Edition, May 1987, Copyright 1987, Hewlett-Packard Co.

Primary Examiner—Gary V. Harkcom
Assistant Examiner—Mark K. Zimmerman
Attorney, Agent, or Firm—Wenderoth, Lind & Ponack

[57] ABSTRACT

A font converting device converts (dot density conversion) a down-line load font received through an interface device into a font represented by a dot matrix of the same size as that of a resident font stored in first memory and stores the converted down-line load font in a second memory. A control circuit selectively reads the fonts of the first memory (resident font) or the fonts of the second memory (converted down-line load font) in conformity to a font code included in print data, edits dot image data, and then provides the same to a printing unit to be controlled, namely, a printer in a narrow sense. Only the rarely used down-line load font is subjected to dot density conversion so that the print dot density of the converted down-line load font coincides with that of the print dot density of the printer to be controlled, while a frequently used font of a print dot density coinciding with that of the printer is stored as resident font. Thus, a plurality of printers differing from each other in print dot density can be connected to the host unit of a system in the same interface conditions without entailing the variation of character pattern and the size of print area.

6 Claims, 8 Drawing Sheets

SYSTEM FOR CONTROLLING PRINTERS HAVING DIFFERING DOT DENSITIES

BACKGROUND OF THE INVENTION

The present invention relates to a printing mode control system for controlling a system including a plurality of printers differing from each other in print dot density connected thereto.

In most cases, an impact wire dot printer and a nonimpact page printer are connected to a system capable of being connected to a plurality of printers differing from each other in print dot density. Generally, the print dot density of the wire dot printer is low, for example, 1/180 in. in dot pitch, due to its structural characteristics, while the print dot density of the nonimpact page printer is very high, for example, 1/240 in. in dot pitch. Accordingly, when a page printer for fine dot matrix print is connected to a system which has also been connected to a wire dot printer for coarse dot matrix print, or when the wire dot printer is disconnected from the system and the page printer is connected to the system, problems arise a that the print size of characters is reduced according to the increase in print dot density and in that the printing area is reduced according to the increase in print dot density.

Figure 1A:
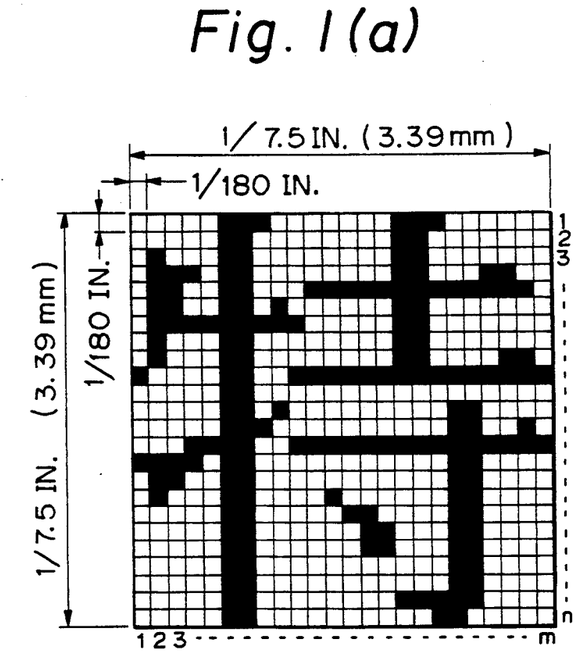
FIGS. 1(a) and 1(b) are illustrations, by way of example, for assistance in explaining a procedure for reducing a character.
Figure 1B:
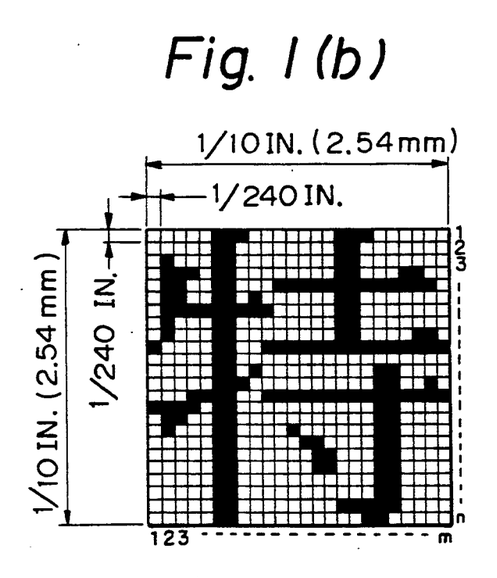
Figure 2A:
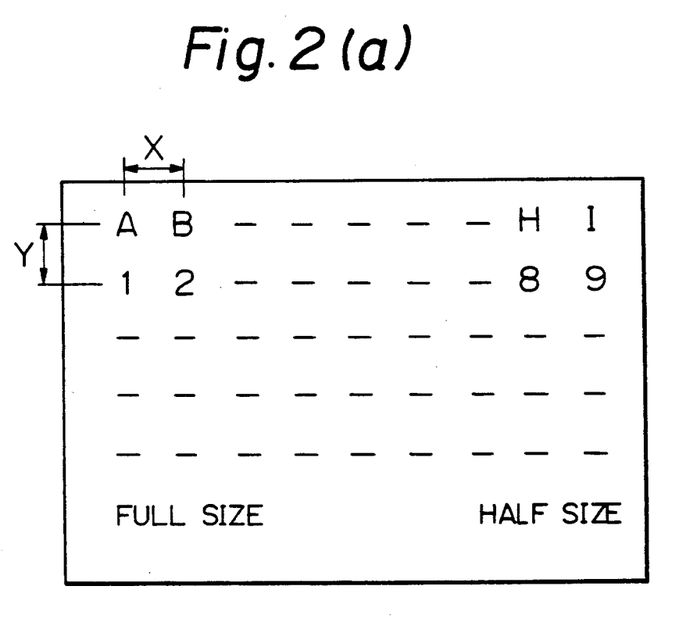
FIGS. 2(a) and 2(b) are illustrations, by way of example, for assistance in explaining a procedure for reducing print area.
Figure 2B:
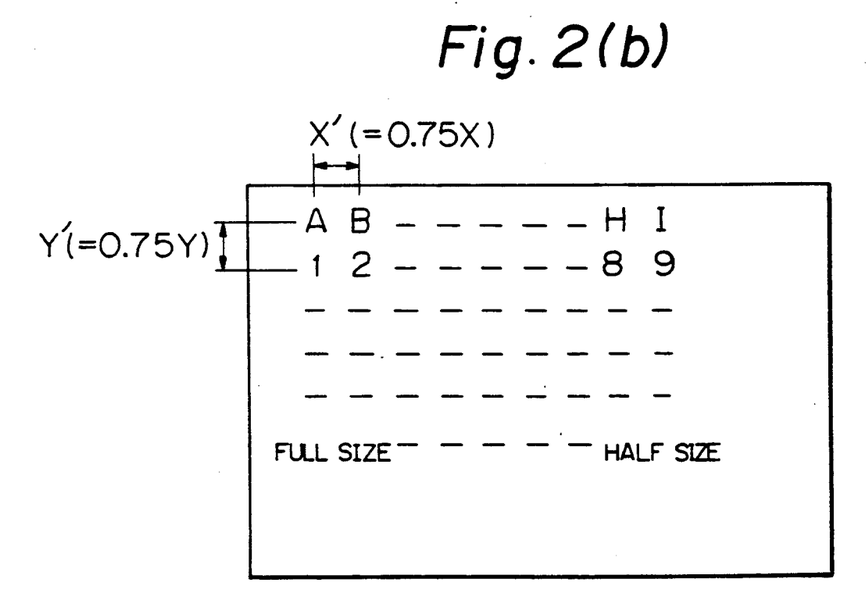

The foregoing problems of the conventional system will be explained more concretely with reference to FIGS. 1(a) and 1(b) showing an exemplary mode of reduction of a character, and FIGS. 2(a) and 2(b) showing an exemplary mode of reduction of a printing area.

The most preferable size of letters, from the viewpoint of readability, is in the 9 to 10 point range (1 point = 0.3514 mm, JIS Z 8305). Generally, a character (font) comprises a 22×22 dot matrix (approximately 3.1 mm × 3.1 mm = 8.8 point) or a 24×24 dot matrix (approximately 3.4 mm × 3.4 mm = 9.6 point) when the print dot pitch is 1/180 in. When a 9.6-point character of the 24×24 dot matrix for a wire dot printer having a 1/180 in. dot pitch as shown in FIG. 1(a) is printed by a page printer having a 1/240 in dot pitch, the 9.6-point character is reduced to a 7.2-point character (approximately 2.54 mm × 2.54 mm), which makes reading the character very difficult. Furthermore, suppose that the wire dot printer having a 1/180 in dot pitch prints characters of an mxn dot matrix on a sheet in a print layout as shown in FIG. 2(a), in which character pitch X and line pitch Y are expressed by $$X = 1/180(in.) \times m(dot) \times a$$

$$Y = 1/180(in.) \times n(dot) \times b$$

where a and b are integral multiples of character size, the page printer having the 1/240 in dot pitch then prints the same characters in an unsatisfactory print layout as shown in FIG. 2(b) deteriorating the layout of print area. In FIG. 2(b), character pitch X' and line pitch Y' are expressed by $$X' = 1/240(in.) \times m(dot) \times a = 0.75X$$

$$Y' = 1/240(in.) \times n(dot) \times b = 0.75Y$$

where m, n, a and b are the same as mentioned above.

In a printing mode control system compensating for such drawbacks, the application program or the like stored in a host unit is provided with an individual print data for a printer using a coarse dot matrix, an individual print data for a printer using a fine dot matrix, and control programs respectively for controlling those printers. For example, the application program of the host unit is provided with a down-line load font using a 24×24 dot matrix for the wire dot printer having the 1/180 in dot pitch, and a down-line load font using a dot matrix of 32×32 for the page printer of 1/240 in. in dot pitch, and registers the down-line load font conforming to the mode of operation of the printer to be controlled among those down-line load fonts.

However, such a printing mode control system, in which the application program in the host unit includes an individual print data for the printer using a coarse dot matrix, an individual print data for the printer using a fine dot matrix, and control programs respectively for controlling those printers, requires a complex application program, and inevitably requires a new application program or reconstruction of the existing application program when connecting an additional printer using a different dot matrix to the system which has been in operation in a previously constructed printing mode control system with a printer using a dot matrix.

SUMMARY OF THE INVENTION

Accordingly, it is an object of the present invention to provide a printing mode control system capable of converting the print dot density of a host unit so that the print dot density of the host unit matches the printing mode, i.e., the print dot density of the printer additionally connected to the host unit to secure satisfactory print quality.

It is another object of the present invention to provide a printing mode control system capable of reducing or enlarging the font of a host unit to make the font of the host unit match the printing mode of a printer so that characters are printed in a highly readable font.

It is a further object of the present invention to provide a printing mode control system capable of decreasing or increasing the character pitch and line pitch of a host unit to make the character pitch and line pitch of the host unit match the character pitch and line pitch of a printer, respectively, so that characters are printed in a satisfactory layout.

It is still a further object of the present invention to provide a printing mode control system capable of converting the print dot density of a font provided by a host unit so that the print dot density of the font provided by the host unit matches that of a printer, and capable of storing a font of a converted print dot density as a down-line load font.

It is an even further object of the present invention to provide a printing mode control system capable of editing an image data by reading either a converted down-line load font having the same size as that of a resident font, or the resident font according to a print data provided by a host unit to edit an image data, and controlling a printer for printing the edited image data.

To achieve the foregoing objects of the invention, the present invention provides a printing mode control system for controlling a system having a plurality of printers differing from each other in print dot density and connected to a host unit, comprising a first memory means for storing a resident font, a font converting means for converting a down-line load font into a converted down-line load font matching the print dot density of the resident font, and second memory means for storing the converted down-line load font provided by the font converting means.

According to the present invention, only a down-line load font is subjected to print dot density conversion to produce a converted down-line load font meeting the print dot density of a printer to be used and print data is printed in the converted down-line load font as well as in the resident font, whereby the deterioration of print quality is obviated, and a plurality of printers differing from each other in print dot density can be connected to a host unit under the same interface conditions.

The above and other objects, features and advantages of the present invention will become more apparent from the following description taken in conjunction with the accompanying drawings.

DESCRIPTION OF THE PREFERRED EMBODIMENT

Figure 3:
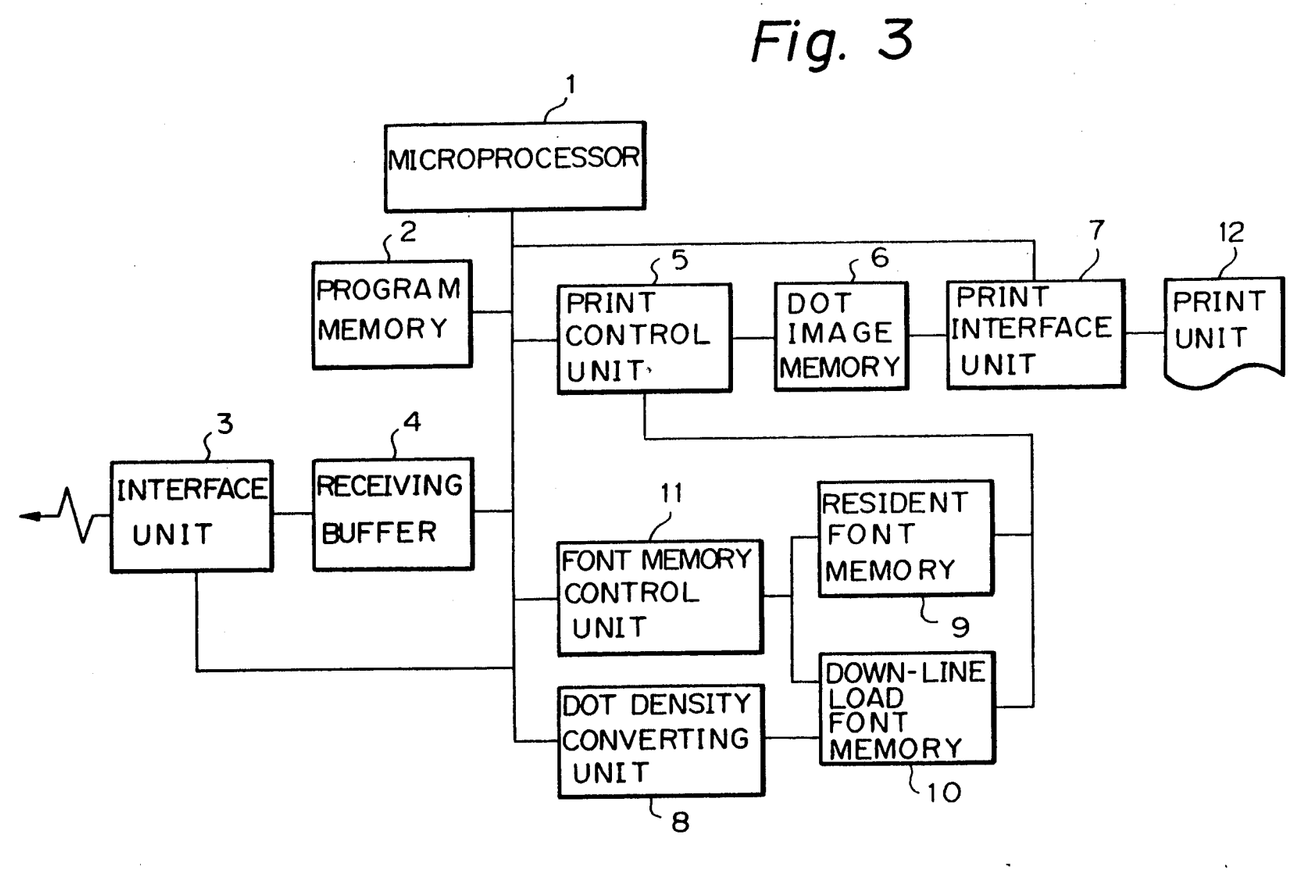
FIG. 3 is a block diagram of a printing mode control system, in a preferred embodiment, according to the present invention.

Referring to FIG. 3, connected to a microprocessor 1 are a program memory 2, an interface unit 3 which communicates with a host unit (not shown) for data transmission, a receiving buffer 4 for temporarily storing received data including print data, a print control unit 5 which edits a received print data in a dot image data of a format in which a print unit 12 prints, a dot image memory 6 for storing the dot image data edited by the print control unit 5, a print interface unit 7 which controls operation for reading the dot image data from the dot image memory 6 and operation for transferring the dot image data to the print unit 12, a dot density converting unit 8 which converts a down-line load font received through the interface unit 3 and the receiving buffer 4 from the host unit so as to conform to the print dot density of the print unit 12, a resident font memory 9 storing a frequently used font conforming to the print dot density of the print unit 12 as a resident font, a down-line load font memory 10 for storing the converted down-line load font converted by the print dot density converting unit 8, a font memory control unit 11 which controls addressing operation for storing the converted down-line load font converted by the print dot density converting unit 8 at a predetermined address in the down-line load font memory 10 and addressing operation for reading the font from the resident font memory 9 or from the down-line load font memory 10 according to a resident font specifying code or a down-line load font specifying code included in the received print data, and the print unit 12 which prints characters and the like on a recording sheet on the basis of dot image data given thereto from the print interface unit 7. FIG. 3 shows only one of a plurality of printers connected to a system. In this embodiment, a device including the components 1 through 12 is designated as a printer. However, the printer may be only the print unit 12 and the remaining components 1 through 11 may be included in an external controller.

In practical application, the printing mode control system may comprise, by way of example, an i 80186 (INTEL) as the microprocessor 1, an HN27512 (HITACHI) as the program memory 2, an i 8051 (INTEL) as the interface unit 3, HM50464 an (HITACHI) as the receiving buffer 4, an MSM 76V002 and MSM76V007 (OKI) as the print control unit 5, an HM514258 (HITACHI) as the dot image memory 6, an MSM 79V001 (OKI) as the print interface unit 7, an MSM 78H015 (OKI) as the print dot density converting unit 8, an PD 23C4000C (NEC) as the resident font memory 9, an HM50464 (HITACHI) as the down-line load memory 10, and an MSM 76V001 (OKI) as the font memory control unit 11.

In this embodiment, rarely used fonts are used commonly in the system as down-line load fonts resident in the host unit.

Figure 4:
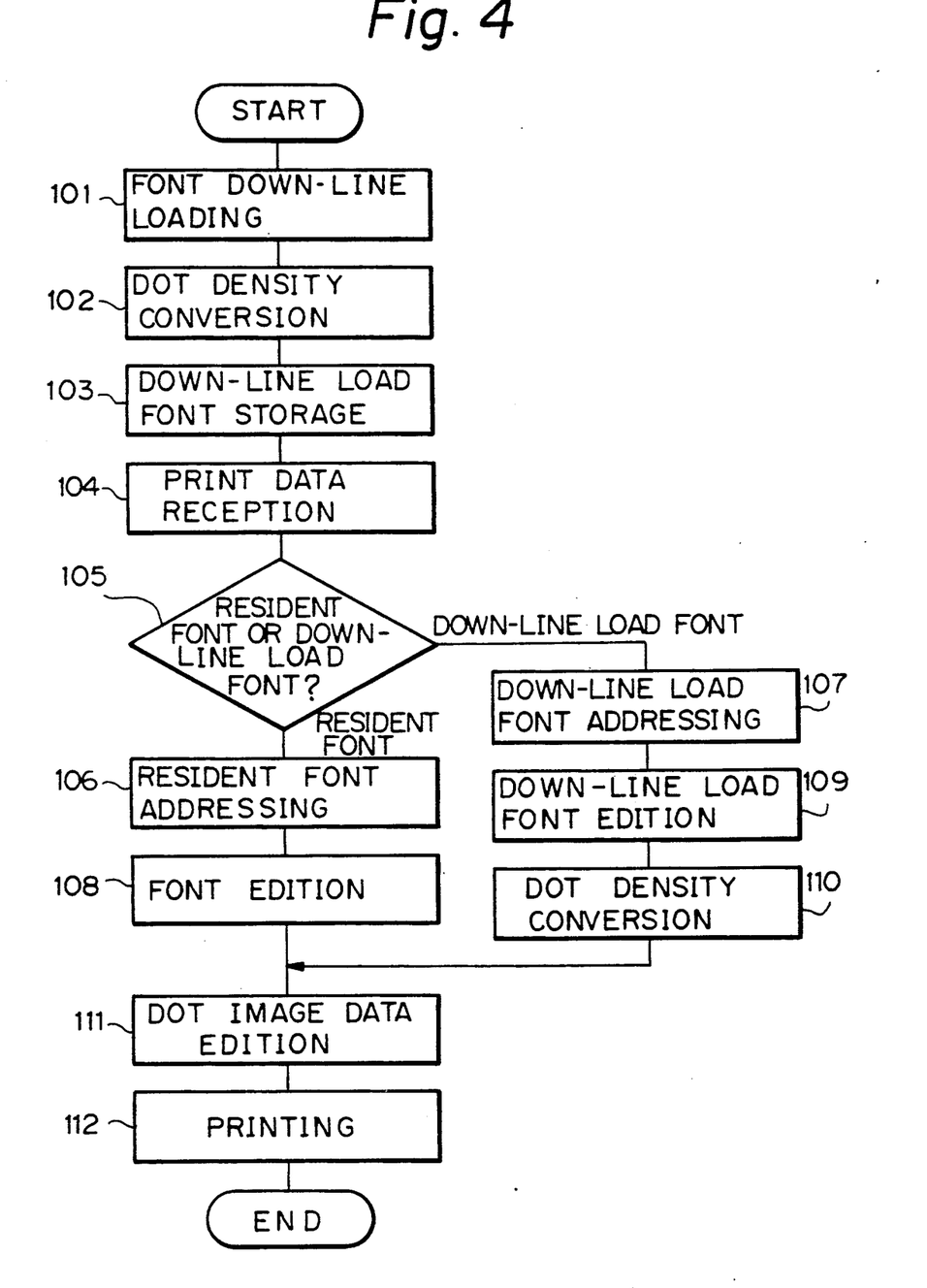
FIG. 4 is a flow chart of assistance in explaining the operation of the printing mode control system of FIG. 3.

Referring to FIG. 4, before receiving print data, a down-line load font of a print dot density different from that of the print unit 12 is provided through the interface unit 3 and the receiving buffer 4 to the print dot density converting unit 8 in step 101. Then, the print dot converting unit 8 converts the down-line load font into a converted down-line load font of a print dot density conforming to the print dot density of the print unit 12 in step 102, and then the converted down-line load font is stored in the down-line load font memory 10 in step 103.

Then, print data is received through the interface unit 3 from the host unit by the receiving buffer 4 in step 104. Then, the microprocessor 1 executes the following steps. In step 105, the microprocessor 1 determines whether the print data stored in the receiving buffer 4 includes a code specifying the resident font or whether the same includes a code specifying the down-line load font. When the print data includes the code specifying the resident font, the microprocessor 1 gives a signal specifying the address of the corresponding resident font to the font memory control unit 11 in step 106. When the print data includes the code specifying the down-line load font, the microprocessor 1 provides a signal specifying the address of the down-line load font to the font memory control unit 11 in step 107.

In steps 108 and 109, the microprocessor 1 provides instruction, according to the codes included in the print data for specifying character pitch and line pitch, to the print control unit 5 to edit the font read from the resident font memory 9 or from the down-line load font memory 10 by the font memory control unit 11. When the character pitch and the line pitch are indicated in dots, the character pitch and the line pitch are converted so as to match the print dot density of the print unit 12 in step 110. In step 111, the print control unit 5 edits the dot image data according to instructions provided thereto from the microprocessor 1, and then stores the edited dot image data in the dot image memory 6. Then, upon the reception of instructions from the microprocessor 1, the print interface unit 7 reads the dot image data from the dot image memory 6 and gives the dot image data to the print unit 12 in step 112.

Functions of the print dot density converting unit 8 will be described hereinafter. The print dot density converting unit 8 has an enlarging circuit for enlarging a dot matrix, and a reducing circuit for reducing a dot matrix.

Figure 5:
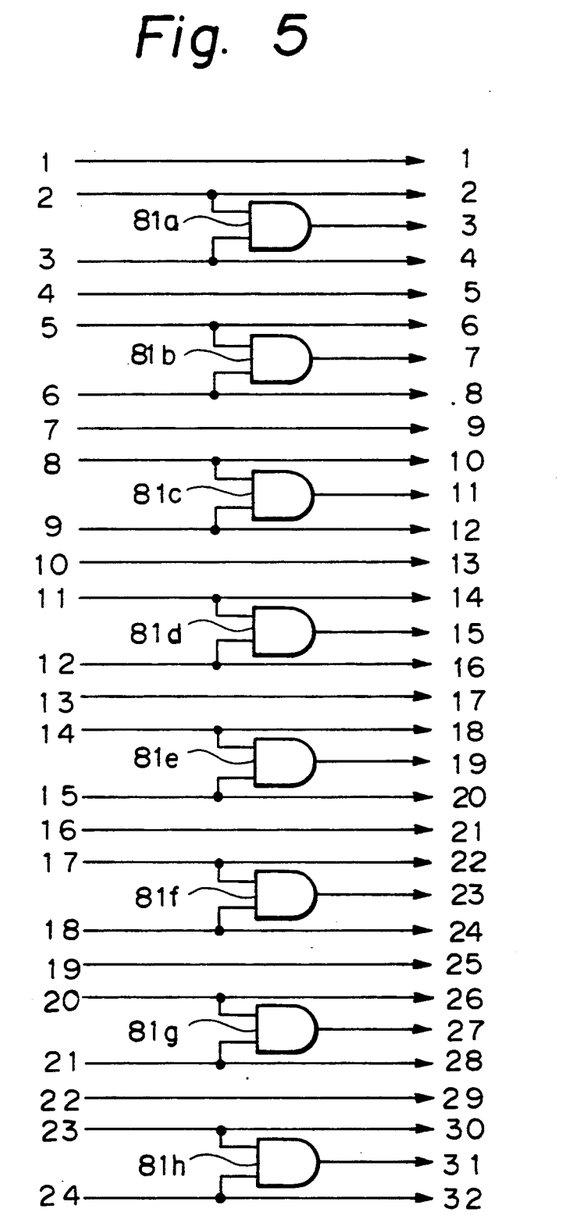
FIG. 5 is an enlarged circuit diagram of the print dot density converting unit of the printing mode control system of FIG. 3.
Figure 6A:
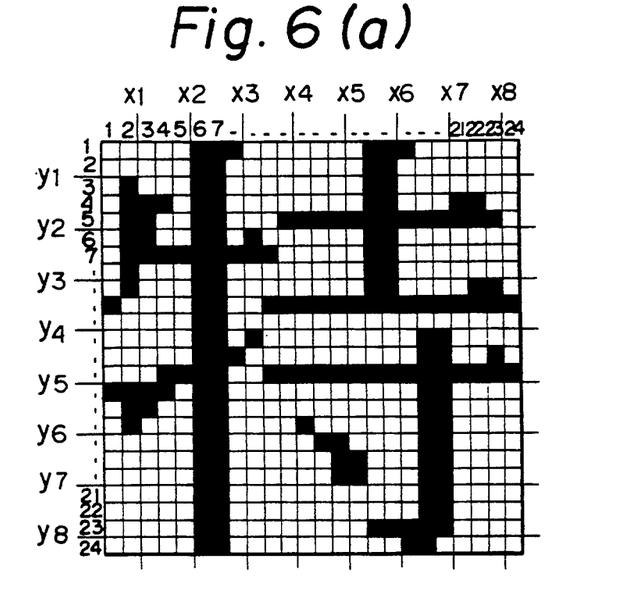
FIGS. 6(a) and 6(b) are illustrations of assistance in explaining a procedure for enlarging a character.
Figure 6B:
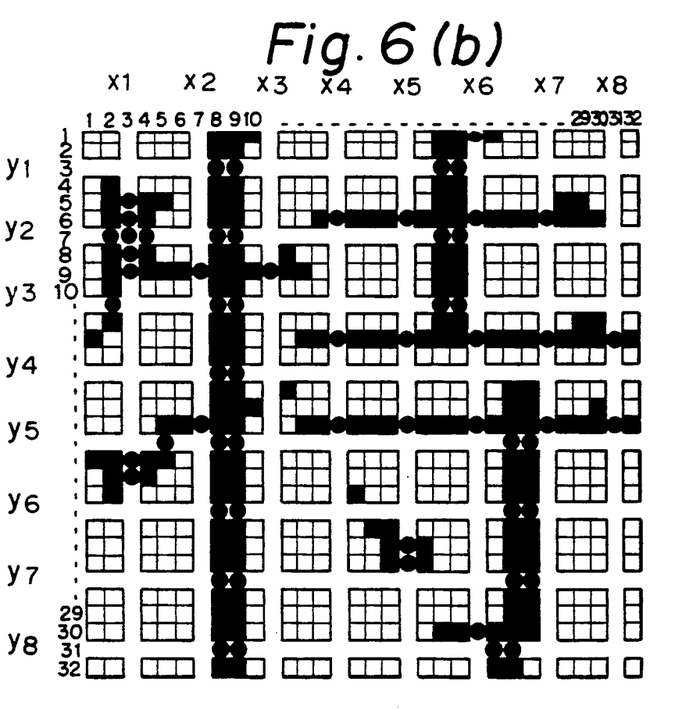

The enlarging circuit is such as disclosed in Japanese Patent Publication No. 56-15555. FIG. 5 shows an exemplary enlarging circuit. FIG. 6(a) shows an original 24×24 dot matrix, and FIG. 6(b) shows an enlarged 32×32 dot matrix prepared by enlarging the original 24×24 dot matrix. In preparing the 32×32 dot matrix by enlarging the 24×24 dot matrix, the 24×24 dot matrix is divided by lines $y_1$ to $y_8$ and rows $x_1$ to $x_8$. Then, portions of the lines $y_1$ to $y_8$ and rows $x_1$ to $x_8$ lying between black dots in FIG. 6(a) are converted into black dots as shown in FIG. 6(b), and the remaining portions of the same are converted into blank dots as shown in FIG. 6(b) to form the pattern of the 32×32 dot matrix as shown in FIG. 6(b). The enlarging circuit shown in FIG. 5 has AND circuits 81a to 81h provided at the respective dividing positions of the rows $x_1$ to $x_8$ (the lines $y_1$ to $y_8$) to convert an original pattern represented by the 24×24 dot matrix into a pattern represented by the 32×32 dot matrix.

Figure 7:
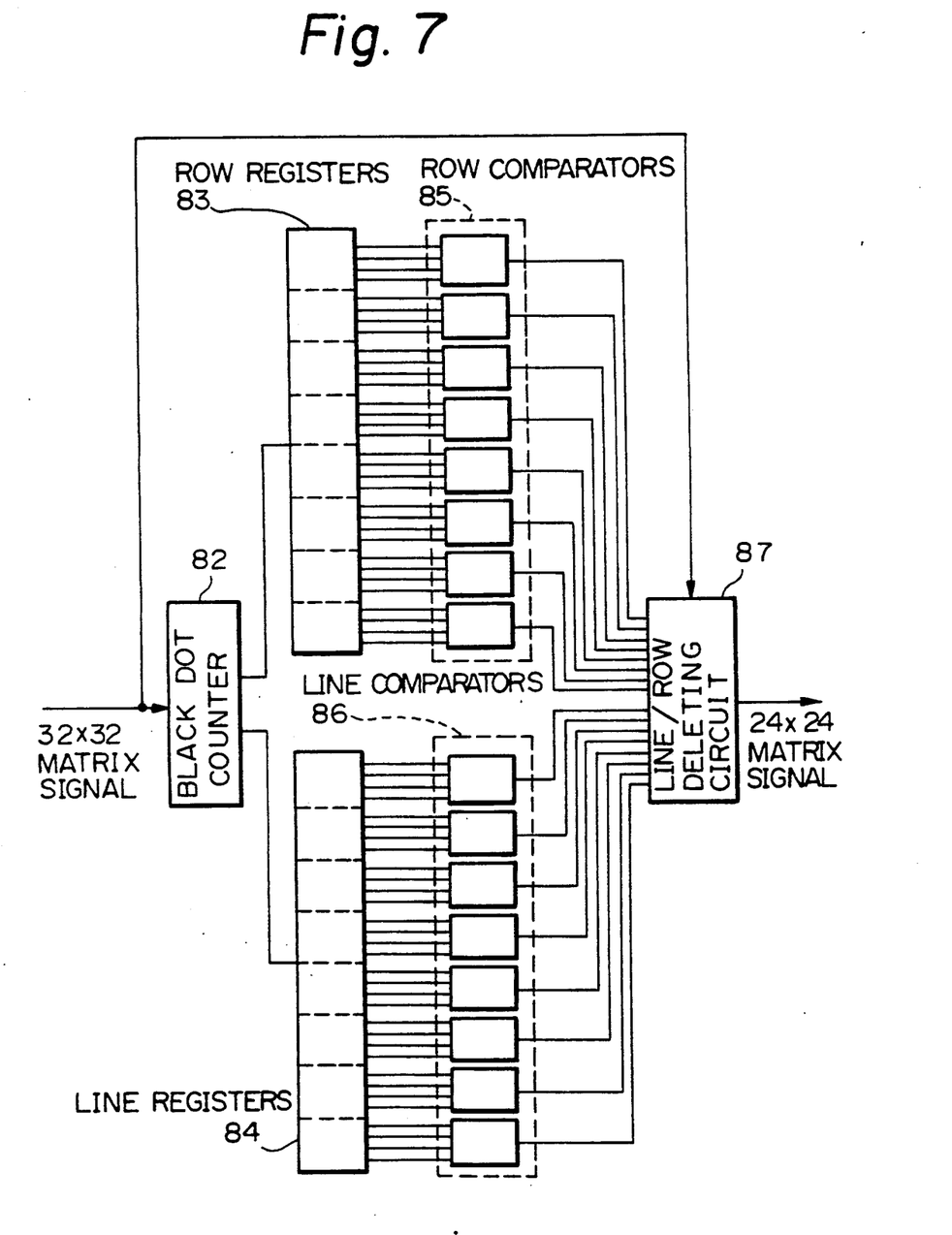
FIG. 7 is a block diagram of a reducing circuit included in the print dot density converting unit.
Figure 8A:
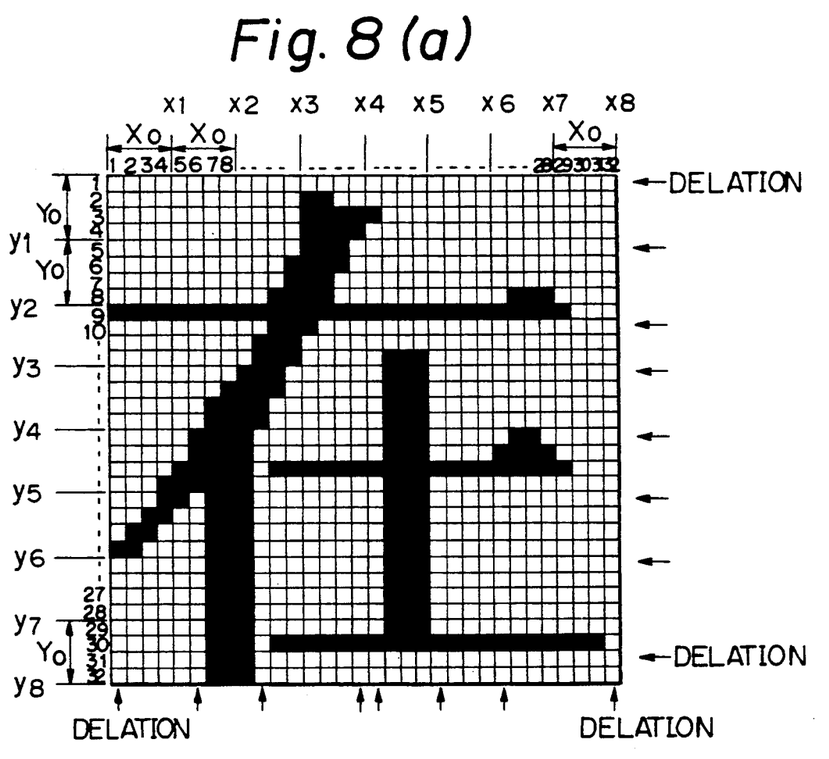
FIGS. 8(a) and 8(b) are illustrations of assistance in explaining a character reducing procedure.
Figure 8B:
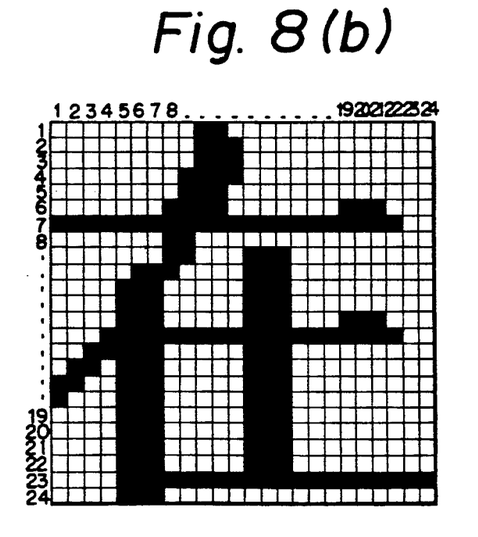

The reducing circuit is such as disclosed in Japanese Patent Publication No. 55-31953. FIG. 7 shows an exemplary reducing circuit. FIG. 8(a) shows an original pattern represented by the 32×32 dot matrix and FIG. 8(b) shows a reduced pattern represented by the 24×24 dot matrix prepared by reducing the original pattern. Referring to FIG. 7 the reducing circuit comprises a black dot counter 82, row registers 83, line registers 84, row comparators 85, line comparators 86, and a line/row deleting circuit 87. In reducing a pattern represented by the 32×32 dot matrix to a pattern represented by the 24×24 dot matrix, the 32×32 dot matrix is divided by lines $y_1$ to $y_8$ and rows $x_1$ to $x_8$. Then, one line having the least black dots among the lines in each division $Y_0$, and one row having the least black dots among the lines in each division $X_0$ are deleted to convert the pattern represented by the 32×32 dot matrix (FIG. 8(a)) into the pattern represented by the 24×24 dot matrix (FIG. 8(b)). The black dot counter 82 counts the number of black dots in the lines and rows, the registers 83 and 84 registers the number of black dots, each row comparator 85 compares the number of black dots in a group of four rows and gives a signal indicating a row having the least black dots to the line-row deleting circuit 87, each line comparator 86 compares the number of black dots in a group of four lines and gives a signal indicating a line having the least black dots to the line-row deleting circuit 87, and then the line-row deleting circuit 87 deletes the lines having the least black dots among those of the corresponding groups to reduce the pattern represented by the 32×32 dot matrix into the pattern represented by the 24×24 dot matrix.

Although the invention has been described with reference to a printer, by way of example, among a plurality of different printers connected to a system, the present invention is not limited to such an application, but may be applied to controlling printing operation in which printers differing in print dot density are connected selectively to the system.

Although the invention has been described in its preferred form with a certain degree of particularity, many changes and variations are possible therein. It is therefore to be understood that the invention may be practiced otherwise than specifically described herein without departing from the scope and spirit thereof.

What is claimed is:

1. A printer having a printing mode control system for controlling printing operations, said printer differing in print dot density from a host unit and connectable to the host unit, the host unit providing down-line load fonts and print data to said printer, said printer comprising:

a first memory means for storing at least one resident font;

a converting means for receiving said down-line load fonts from said host unit and for converting each down-line load font received from said host unit into a converted down-line load front having a print dot density conforming to a print dot density of said at least one resident front stored in said first memory;

a second memory means, coupled to said converting means, for storing said converted down-line load font; and a font memory control means, coupled to said first and second memory means, for addressing one of said at least one resident font stored in said first memory means and said converted down-line load front stored in said second memory means according to a font code provided in the print data received from the host unit, said font code specifying a reading of one of said at least one resident font and said converted down-line load font.

2. A printer as recited in claim 1, wherein said resident font is represented by a 24×24 dot matrix and said down-line load font is represented by a 32×32 dot matrix.

3. A printer as recited in claim 1, wherein said resident font is represented by a 32×32 dot matrix and said down-line load font is represented by a 24×24 dot matrix.

4. A printer having a printing mode control system for controlling printing operations, said printer differing in print dot density from a host unit and connectable to the host unit, the host unit providing a down-line load font and print data to said printer, said printer comprising:

a first memory means for storing at least one resident font;

an interface means for receiving said down-line load font and said print data, said print data having a code specifying a reading of one of said at least one resident font and said down-line load font;

a converting means, coupled to said interface means, for converting a font size of said down-line load font into a converted down-line load font having a font size equal to that of said at least one resident font;

a second memory means, coupled to said converting means, for storing said converted down-line load font;

an image formation means for outputting dot image data according to an edited page image data; and a control means, coupled to said first memory means, said second memory means, and said image formation means, for selecting one of said converted down-line load font stored in said second memory and said at least one resident font stored in said first memory according to said code of said print data, and for converting said print data into edited page image data, and for writing said edited page image data into said image formation means.

5. A printer having a printing mode control system for controlling printing operations, said printer differing in print dot density from a host unit and connectable to the host unit, the host unit providing a down-line load font and print data to said printer, said printer comprising:

a first memory means for storing at least one resident font;

an interface means for receiving said down-line load font and said print data provided by the host unit, said print data having a font code specifying a reading of one of said at least one resident font and said don-line load font;

a buffer means, coupled to said interface means, for temporarily storing at least a portion of said print data received by said interface means;

a converting means, coupled to said interface means, for converting a print dot density of said down-line load font into a converted down-line load font having a dot density equal to that of said at least one resident font;

a second memory means, coupled to said converting means, for storing said converted down-line load font;

a font memory control means, coupled to said first and second memory means, for addressing one of said at least one resident font and said down-line load font in accordance with a received font specifying signal; and a control means, coupled to said buffer means, said interface means, said converting means and said font memory control means, for reading said font code specifying a reading of one of said at least one resident font and said down-line load font of said print data temporarily stored in said buffer, and for outputting and providing to said font memory control means said code specifying signal in accordance with the thus read font code of said print data.

6. A printer as recited in claim 5, wherein said converting means further includes a means for converting a font size of said down-line load font to a font size of said at least one resident font, wherein said font size of said at least one resident font is equal to a font size of said converted down-line load font.

* * * * *